United States Patent [19]

Yang

[11] Patent Number: 4,820,763

[45] Date of Patent: Apr. 11, 1989

[54] POLY(VINYL CHLORIDE) POLYBLEND CONTAINING A CRYSTALLINE POLYESTER WITH LIMITED MISCIBILITY AND REINFORCED COMPOSITES THEREOF

[75] Inventor: Wei-Yeih Yang, Brecksville, Ohio

[73] Assignee: The B. F. Goodrich Company, Akron, Ohio

[21] Appl. No.: 38,103

[22] Filed: Apr. 14, 1987

Related U.S. Application Data

[63] Continuation-in-part of Ser. No. 763,498, Aug. 8, 1985, abandoned.

[51] Int. Cl.$^4$ ............... C08L 27/06; C08L 67/02
[52] U.S. Cl. ............................. 524/505; 524/513; 525/92; 525/173; 525/174
[58] Field of Search ................. 525/92, 173, 174; 524/505, 513

[56] References Cited

U.S. PATENT DOCUMENTS

| | | | |
|---|---|---|---|
| Re. 28,982 | 9/1976 | Crawford | 525/173 |
| 3,501,554 | 3/1970 | Aylesworth | 525/173 |
| 3,686,361 | 8/1972 | DeWitt | 525/173 |
| 3,718,715 | 2/1973 | Crawford | 525/173 |
| 3,972,962 | 8/1976 | Williams | 525/173 |

*Primary Examiner*—Patricia Short

*Attorney, Agent, or Firm*—Alfred D. Lobo; James R. Lindsay

[57] ABSTRACT

A polyblend of poly(vinyl chloride) ("PVC") and a copolyester ("CPE") consists essentially of three components in a structure —(MR)$_x$—(MQ)$_y$— wherein (MR)$_x$ represents an ester segment with a repeating unit of mol wt 204 or 220, (MQ)$_y$ an ester segment consisting of a residue of a polyester diol, so that the CPE is non-elastomeric and has a m p in the range from above 170° C. to about 220° C. Then the CPE provides a limited plasticizing function in PVC when the CPE is used in the range from about 30 to about 70 parts by wt based on 100 parts of the polyblend. The lack of a typical plasticizing function is evidenced by a relatively flat modulus curve, preferably one having a slope less than $1.2 \times 10^5$ psi per unit weight of PVC in the polyblend. A glass reinforced composite of from about 30 to 70 parts by wt PVC and from 30 to about 50 parts by wt of CPE provides a HDT which is greater than might be expected by directly proportioning the effect of the glass fibers in reinforced PVC, and reinforced CPE; the tensile strength of the reinforced composite is greater than 10,000 psi. The crystallinity of the CPE is such that it has essentially no extensibility, a flexural modulus of $3.8 \pm \times 10^5$ psi and limited miscibility in the PVC. The limited miscibility is responsible for the unique morphology of the polyblend.

14 Claims, 8 Drawing Sheets

POLY(VINYL CHLORIDE) POLYBLEND CONTAINING A CRYSTALLINE POLYESTER WITH LIMITED MISCIBILITY AND REINFORCED COMPOSITES THEREOF

This application is a continuation-in-part of Ser. No. 763,498 filed Aug. 8, 1985, now abandoned.

BACKGROUND OF THE INVENTION

This invention is related to a polymer blend ("polyblend") 100 parts by weight (by wt) of which comprises from about 70:30 to about 30:70 parts of poly(vinyl chloride) ("PVC") and a copolyester ("CPE") having particular chemical and physical properties. The CPE is not referred to as a segmented copolyester ("SCPE") because this SCPE nomenclature refers to a copolyester in which there are readily distinguishable long chain segments and short chain segments. There are no chain segments of readily distinguishable length, whether long or short, in a CPE which consists essentially of all ester segments with no ether linkages, each segment containing an aryl dicarboxylic acid residue connected to either diol or polyester diol segments, the majority of which polyester diol segments have a number average molecular weight (Mn) less than 600.

In a CPE, a multiplicity of the ester diol segments are either derived from ester interchange with a polyester diol, or by polycondensation in those instances where a polyester diol with the desired repeating units is no readily available. Further, the terms CPE and SCPE serve to minimize the confusion resulting from referring to prior art segmented copolyesters containing long chain segments, and copolyesters used in the instant invention which CPEs were only derived from long chain polyester diols by ester interchange or by polycondensation.

The polyblend of the instant invention has essentially no plasticizing function typically obtained with prior art plasticizers, yet the polyblend has unexpected and desirable processing characteristics, especially when it is reinforced with glass fiber. The processability of my polyblend is particularly noteworthy because my CPE is non-elastomeric unlike prior art polyblends made with an elastomeric SCPE.

Articles formed from commercially available PVC, such as rigid extruded PVC pipe, and compression and injection molded articles of a great variety of shapes and sizes, have the common properties of relatively low heat distortion temperature (HDT), low impact resistance, low flexural strength and high susceptibility to failure due to repeated stress. One of the schemes in the prior art, to counter these negative qualities, is to provide a wide array of polyblends in which a relatively highly crystalline polyester having certain essential characteristics, is miscible. More commonly the polyblends included a polyester resin prepared from short chain aliphatic glycol and diacid monomers such as are disclosed in U.S. Pat. No. 3,574,789 which polyester has a crystalline melting point (m p) below about 170° C., and is miscible in PVC, but which m p was simply too low to provide limited miscibility. It is self-evident that a useable polyester for the polyblend cannot have a m p above that of the processing temperature of the PVC if its (PVC's) degradation is to be avoided.

By "miscible" I refer to a solubility of the polyester in the PVC, or vice versa, such that the polyblend exhibits no discernible separation of amorphous phases, and a single glass transition temperature ("$T_g$"). Among these polyblends are those disclosed in "A Study of Aromatic Polyester/Chlorinated Polymer Blends" by M. Aubin and R. E. Prud'homme, *Polym. Engin.Sci.* 24, 587 (1984).

Other references dealing with the problem of how to obtain complete or nearly complete miscibility characterized by the foregoing criteria include the following: "Applications of Polymer Blends: Emphasis on Recent Advances" by L. M. Robeson, *Polym. Eng. Sci.* 24, 587 (1984); "Miscibility of Semicrystalline Segmented Polyether Ester Copolymers in Poly(Vinyl Chloride)" by M. H.Lehr, *Studies in Physical and Theoretical Chemistry*, Vol 10 Elsevier Scientific Publishing Company (1978); "Improvement of the Impact Strength of a Blend of Poly(Vinyl Chloride) with Copolyester Thermoplastic Elastomer by Heat Treatment" by T. Nishi and T. K. Kwei, *J. Appl. Polym. Sci.*, 20 1331-1337 (1976).

More particularly, this invention is directed to a polyblend prepared by mechanical mixing of its solid components which yields a mixture consisting of a matrix and a dispersed particle phase, any one of which contains within its physical boundary, two well-mixed polymers as distinct discernible phases. If a reinforcing filler such as glass fiber is added, the matrix includes a third phase. Each additional filler or immiscible additive constitutes an additional phase.

The recent interest in polyesters or copolyesters (together referred to hereinafter as "(co)polyesters" for brevity) which are miscible with chlorinated polymers such as PVC, chlorinated PVC ("CPVC"), chlorinated poly(ethylenes), and copolymers of vinylidene chloride, has centered upon the particular ester concentration of the (co)polyester which defines a "miscibility window" in which miscibility is found. Outside this window there is reputed to be "immiscibility", there purportedly being no intermediate condition or state. The CPEs used in the polyblend of this invention are neither immiscible nor inside the window of miscibility but have "limited miscibility" which is critical for polyester crystal formation during the melt cooling of the polyblend into shaped articles.

The term "polyblend" is used herein to connote a mixture of PVC and CPE which maintains a polyphase or multiple phase polymeric structure consisting essentially of PVC-rich and CPE-rich amorphous phases, and crystalline PVC and CPE phases, which structure satisfies the criteria defining "limited miscibility". A CPE having limited miscibility is one which has sufficient crystallinity so that, when blended with the PVC, the polyblend has distinct discernible phases characterized by a crystallinity in the range from 25% to about 55% based on CPE.

The essential criterion of limited miscibility which the CPE in the PVC/CPE polyblend of this invention meets, is specified in greater detail hereinbelow by giving (i) the composition of the polyblend and the characteristics of its components, (ii) the sample history as to method of preparation, (iii) the method and instruments used to determine limited miscibility, and (iv) the experimental results and conclusions.

The term "miscible" is preferred rather than, say, the term "compatible" because the latter term has been often misapplied and misconstrued despite studious and concerted efforts on the part of many to lend uniformity to its meaning (see, for instance, "The Concept of Compatibility in Polyblends" by Arthur J. Yu in the chapter titled "Multicomponent Polymer Systems", *Encyclopedia of Polymer Science and Technology,* inter alia).

In the prior art, the vague term "compatible" has been used as an equivalent for "miscible", as has been the term "plasticized with", irrespective of the amount used, whether the "plasticizer" is an internal plasticizer, that is, is chemically reactive with PVC which is thus plasticized, or miscible with it so that it does not bleed or bloom from it, or immiscible with it so that it does.

In all the foregoing instances in which a polyester is blended with PVC, there is a plasticizing effect attributable to the polyester used, as there is in the present invention, but only to the extent that there is a drop in modulus with increasing concentration of CPE. However, there is a characteristically small drop in modulus as a function of CPE concentration, and a distinctive lack of a straight line relationship which is typical of a plasticizer in a prior art polyblend as will be evident from FIG. 8 which will be explained more fully hereinafter. Particularly in comparison with commercially available prior art polyblends using Hytrel brand SCPEs, inter alia, this lack of typical plasticizing effect is attributable to my CPE being non-elastomeric while SCPEs are elastomeric. Thus, the type of plasticizing effect I obtain, and the conditions under which it comes into play have a critical effect on the processing characteristics of the polyblend and its physical and chemical properties, for example, its unique morphology, lack of substantial extensibility and good solvent resistance.

U.S. Reissue Pat. No. Re. 28,982 to Crawford et al. teaches a blend of PVC and a semicrystalline SCPE having long chain "soft" and short chain "hard" ester segments or units. The long chain units are derived from a dicarboxylic acid and a poly(alkylene oxide)-glycol having a mol wt in the range 600–6000. The short chain units are derived from a dicarboxylic acid and a low mol wt diol. The blends so formed are elastomers marketed as the Hytrel$^R$ copolyesters. These SCPEs were used in the Lehr, supra, work in which he reported their partial miscibility in PVC which partial miscibility was enhanced after the primary particles of PVC began to break down, and, because the Hytrel SCPEs lacked the requisite chemical structure and crystallinity, he missed the critical significance and effect of obtaining at least 25% crystallinity in the polyblend, regardless of whether the phases he observed in his partially miscible blends were co-continuous, or, the morphology of the PVC primary particles in the blends was maintained.

Though it is noted that Crawford teaches that his SCPE may have as little as 5 wt % of the soft segments, even if these segments were derived from a polyester diol, the melting point of his SCPE would be above 220° C., which is too high to be melt-blended with PVC. This melting point can be physcially measured, or calculated according to the equations given in the Jelinski article infra, and are found to be above the processing temperature of unplasticized PVC. The 5 wt% of the soft segments were specifically required to be derived from a polyester diol under conditions chosen to avoid "interchange during polymerization" (col 5, lines 1-11, '982 patent), that is, under conditions chosen to avoid breakup of the polyester.

It is also noted that, since all the segments in Crawford's SCPE are randomly joined, there is a small statistical chance that a long chain hard segment may be formed from the proliferation of short chain hard segments known to be formed. Even where, as in Hytrel 7246, the average hard block length is 22 units and 81% by wt of the SCPE is hard (see "C$^{13}$ Nuclear Magnetic Resonance Studies of Solid Segmented Copolymers—I—Mobile Domains of a Polyester Thermopolastic Elastomer" by L. W. Jelinski, et al *Macromolecules* pg 583, Vol 14, No. 3, May–June 1981)., typical plasticization is clearly obtained. This was corroborated by the studies of Lehr, supra. There is no teaching in Crawford to suggest that long chain hard segments would be desirable for changing the morphology obtained by plasticization. Of course, a lack of plasticization was to be expected with increasing crystallinity, and an increase of melting point was expected to be obtained with a smaller percentage of soft segments, but the clear teaching of Crawford was to avoid those circumstances and nothing which enables one to make the necessary modifications to alter the SCPE to end up with a CPE.

Less than a year earlier, De Witt et al, in U.S. Pat. No. 3,686,361 had disclosed that poly(propylene terephthalate) ("PPT" for brevity) in a polyblend with PVC, improved processing characteristics and reduced the melt viscosity of the polyblend. Though it appeared that the mol wt of the PPT was not critical, they failed to realize that in amounts up to about 20%, the PPT had a plasticizing function without a substantial amount of additional conventional trioctyl trimellitate ("TOTM") plasticiser, but at higher percentages, so much TOTM was required that the hardness and forming temperatures of the polyblend were both severely depressed. They did not recognize that PPT, without short chain "soft" aliphatic or cycloaliphatic (together referred to as "(cyclo)aliphatic" for brevity) polyester segments interspersed in the copolyester chain, lacked the appropriate chemical structure and adequate balance between crystallinity and the morphology which dictates the limited miscibility of the copolyester in the PVC. They had no incentive to modify the high crystallinity of the PPT, and no reason to suggest that a relatively high proportion of "soft" short chain aliphatic polyester segments (10 to 30 parts by wt per 100 parts polyblend) of lesser crystallinity would adequately modify it, and thus provide the desired morphology.

It was never recognized that the essential key to forming a desirable polyblend of PVC with a polyester was to provide a CPE which had limited misciblity in the PVC, and that this key would be provided by a tailored CPE which was non-elastomeric and had a m p in the range from above 170° C. to about 220° C. Unlike the elastomeric SCPE of the '982 patent which has short chain hard PBT (say) segments, and long chain soft poly(alkylene oxide) ester glycol segments, the tailored CPE used in my invention has all ester segments more than 50% of which have a residue of a diol which has a Mn less than 600. Such a CPE becomes a specific and necessary component of the polyblend because it provides a balance between the crystallinity required and the limited miscibility of the CPE in the PVC. This balance is determined by the particular structure of the CPE, and, for this CPE, is peculiar to vinyl chloride homopolymer. Such limited miscibility of the CPE does not extend to copolymers of vinyl chloride.

Still more particularly, this invention is related to a PVC/CPE polyblend which is reinforced with glass or other inorganic fibers without substantially vitiating the strong affinity the two polymers show for each other despite the discernibly separate phases. This affinity is adduced by the small domain sizes of the polyblend, it being recognized that if "miscibility" is to mean "single homogeneous phase" such as is associated with nearly complete mixing of the molecules at the molecular level, as it does for simple liquids, only a few polyblends are found to be truly miscible, and the polyblend of this invention is not among them.

SUMMARY OF THE INVENTION

It has been discovered that the key to providing a polyblend of unplasticized PVC with desirable physical characteristics is to blend from about 70:30 to about 30:70 parts by wt of the PVC with a crystalline copolyester ("CPE") which has limited miscibility in the PVC. The CPE consists of "MR" segments of polypropylene terephthalate (PPT) or polybutylene terephthalate (PBT), and "MQ" segments of an aryl dicarboxylic acid connected to aliphatic or cycloaliphatic saturated polyester diol segments (see structure I). Such limited miscibility is evidenced by a crystallinity of at least 25% based on CPE, and two distinctly discernible polymer phases consisting of a CPE-rich matrix and dispersed PVC-rich particles. The term "rich" connotes the presence of more than 50% by wt of that polymer.

It has further been discovered that limited miscibility, and highly desirable properties due thereto, are obtained in a PVC/CPE polyblend, free of plasticizer, if the distinctly discernible phases are in the form of (a) macroparticles, which are clusters of PVC primary particles, suffused with CPE, both the PVC and the CPE being either (i) co-continuous phases, or (ii) miscible; and, (b) a matrix phase of substantially separate PVC particles ("domains") and CPE present as co-continuous phases. In either phase (a) or (b) there is wetting of individual PVC domains by CPE, that is, molecular mixing of some CPE and PVC which is evident as a diffuse boundary of a PVC domain. The matrix (b) is present as the major phase and the dispersed macroparticles (a)(ii) are desirably held to a minimum. The chemistry of the polyblend is so chosen as to ensure a crystallinity in the range from 25% to about 50%.

It has further been discovered that if a polyblend is prepared of a relatively high mol wt PVC and a CPE, and the CPE itself has (i) a crystallinity in the range from 30-90%, (ii) a melting temperature (Tm) in the range of processing temperatures of the PVC, and (iii) a well-defined chemical composition which infuses only limited miscibility of the polyester in the PVC, or vice versa, then the polyblend has unique properties. In particular, it has a flexural modulus of $3.8 \pm 0.5 \times 10^5$ psi, that is, greater than $3.3 \times 10^5$ up to about $4.3 \times 10^5$ psi.

It is therefore a general object of this invention to provide a polyphase polyblend of PVC and a crystalline CPE, by (a) tailoring the structure of the copolyester to provide predetermined crystallinity and a preselected Tm, and (b) mechanically blending the copolyester and PVC so as to maintain a state of limited miscibility of copolyester in the PVC, so that the polyblend has a single broadened $T_g$ relative to either pure component.

It has still further been discovered that if a copolyester consists essentially of three components, including (a) terephthalic acid and a minor amount, relative to the terephthalic acid, of isophthalic acid; (b) 1,3-propane diol or 1,4-butane diol which, with component (a) forms a PPT or PBT chain (referred to as the MR segment); and, (c) a polyester diol residue of an $C_2$-$C_{12}$ alkanedioic acid or cycloalkanedioic acid ("(cyclo)alkanedioic") and a $C_2$—$C_{12}$ alkane diol or cycloalkane diol ("(cyclo)alkane") coupled with component (a), so that the CPE has a m p in the range from above 170° C. to about 220° C.; then, the CPE provides a limited plasticizing function in PVC without substantially denigrating the desirable properties of PVC when the CPE is used in the range from about 30 to about 70 parts by wt based on 100 parts of the polyblend. The term "polyester diol" or "ester glycol" is used to emphasize the glycol chain ends.

It is also a general object of this invention to provide a polyblend containing in the range from about 30:70 to about 70:30 parts by wt of PVC and a CPE respectively, the latter having a crystallinity in the range from 30% to about 90%; such a polyblend may include from about 5% to about 40% by wt of a reinforcing filler, and if so reinforced, the polyblend has a HDT which is greater than that which would be expected by a proportional contribution of the HDT of the CPE and the HDT of the unblended PVC in the polyblend.

It is also a specific object of this invention to provide a glass fiber reinforced composite consisting essentially of a polyblend of from 50 to 70 parts by wt of PVC and from 30 to 50 parts by wt of a CPE consisting of chains of PBT or PPT segments, or a mixture thereof, and chains of phthalic or isophthalic acid with a (cyclo)aliphatic ester glycol, which composite has a tensile strength greater than 10,000 psi measured by ASTM D-638; and, a HDT greater than that which might be expected by a direct proportional effect of the glass fibers in reinforced CPE and reinforced PVC.

BRIEF DESCRIPTION OF THE DRAWINGS

The foregoing and other objects and advantages of my invention will appear more fully from the following description of preferred embodiments of it, some of which description is set forth in conjunction with the accompanying drawing wherein:

FIG. 8 is a graph of flexural modulus (psi) plotted against the weight percent (wt %) of PVC in the polyblend, for the claimed polyblend and a prior art polyblend.

DETAILED DESCRIPTION OF PREFERRED EMBODIMENTS

The polyblend of this invention exhibits the unexpected improvement in physical properties only with homopolymers of PVC and the specified CPE when each is present in the relatively narrow range of 70:30 to 30:70 parts by wt based on 100 parts of additive-free polyblend. If the CPE is present in less than about 30 parts, or, the crystallinity of the polyblend is less than 20% as determined by a heat of melting which is less than about 9 J/g, then the CPE only provides a typical plasticizing function with no improvement in physical properties.

The polyblend of this invention consists essentially of PVC and the above-identified CPE. The PVC may be any commercial grade homopolymer having an inherent viscosity ("i.v.") measured in cyclohexanone at 30° C., greater than 0.4, preferably in the range from about 0.4 to about 1.5, and other particular physical properties of the PVC are not narrowly critical. A particularly desirable PVC is commercially available as *Geon ® 110×377 brand PVC having an i.v. of about 0.54. The heat deflection temperature (HDT) of preferred PVC is in the range 64°-70° C., its second order or glass transition temperature ($T_g$) is about 83°-90° C., and it is processed at about 182° C., or higher to yield rigid PVC shapes. The polyblend of this invention exhibits an HDT which exceeds that which might be expected due to the proportional effects of the CPE and unblended PVC when each is reinforced with a reinforcing filler such as Kevlar ® aramid, boron, carbon or glass fiber, the last being most preferred for typical high performance applications.

*GEON is a Registered Trademark of The B. F. Goodrich Company

Though it is generally believed that "High performance composites are formed by combining two or more homogeneous materials in order to achieve a balance of material properties that is superior to the properties of a single material" (see *Encyclopedia of Chemical Technology*, by Kirk and Othmer, p 260, Suppl. Vol., 3rd Ed., 1984), the fiber-reinforced polyblend of this invention achieves a surprisingly high HDT and other desirable properties with polymers which are not homogeneous, but have only limited miscibility.

It is generally recognized (see "Predicting the Properties of Mixtures: Mixture Rules in Science and Engineering" by L. E. Nielsen, pg 1) that properties of multicomponent mixtures are not predictable from concentrations of components, and that in order to relate properties of such mixtures to composition, it is necessary to know about the interactions between ingredients, particle size and shape, and the nature of the packing found in the mixture. These latter descriptions of mixture involve knowledge of the adhesion among components and the morphologies of the various phases. Neither of these elements needed to predict properties of mixtures can be known with certainty without specific studies into the nature of the adhesion and morphology.

In the case of the polyblends of this invetnion, such studies have not been reported. It will be evident from the descriptions below that the unexpected improvement in HDT observed, particularly with the glass fiberreinforced polyblends, must be a consequence of the unexpected morphologies brought about by the factors of chemical structure and crystallinity of the CPE causing limited miscibility with PVC.

The HDT of the compositions tested are determined by ASTM D-648. The test specimens used are molded bars 5" long and have a 0.25"×0.50" cross-section. The test composition is first dry blended and is then milled, as described in more detail hereinafter in connection with the examples, to form a coherent sheet which is subsequently removed from the mill and cooled. The sheet is cut into strips which are molded at a temperature of about 200° C. and a pressure of about 3000 psi, then cooled within a period of 5 min to room temperature in a water-cooled press, to prepare the specimen bars in the desired size for testing. The stress applied on the samples is 264 psi and the immersion medium is a silicone oil heated during the test at an average rate, starting at room temperature, of about 2° C./min.

The CPE used in my polyblend is necessarily crystalline, preferably having a crystallinity in the range from about 30–90%. The m p of the CPE is determined as a readily observable crystalline m p peak on a differential scanning calorimeter (DSC curve), or as an ostensible crystalline m p peak where a showing of crystallinity is supported by X-ray diffraction results.

The CPE of this invention may be represented by the formula $$-(MR)_x-(MQ)_y- \qquad (I)$$

wherein, $(MR)_x$ represents an ester segment having a repeating unit with a mol wt of about 204 or 220;

$(MQ)_y$ represents an ester segment consisting essentially of the residue of a polyester diol;

M represents the residue of terephthalic acid which may include a minor amount of isophthalic acid, preferably less than 10 mole % of isophthalic acid;

R represents the residue of 1,3-propane diol or 1,4-butane diol;

Q represents the residue of a (cyclo)aliphatic polyester of an aliphatic or cycloaliphatic dibasic acid having from 2 to about 12 carbon atoms, and, an alkane or cycloalkane diol having from 2 to about 12 carbon atoms, the MQ segments being derived by ester interchange with a polyester diol; and, x and y represent the mole fractions present, y being in the range from 0.03–0.10 when x is 1.0, so that a majority of all MQ segments have a residue of a polyester diol having a number average molecular weight less than 600.

The foregoing structure of the CPE is obtained by transesterfication resulting in the end-to-end linking of

MR segments and MQ segments (which may be regarded as relatively hard and soft, respectively).

Preferred CPEs of this invention are represented by the formula (II):

$$Q-(MR)_{x-1}-(MQ)_{y-1}-MRQ \qquad (II)$$

$(MR)_{x-1}$ most preferably represents PBT and may include up to 10 parts by wt of poly(butylene isophthalate) ("PBIT") per 100 parts of PBT which has a number average molecular weight Mn in the range from 5000 to about 30000.

The (cyclo)aliphatic dicarboxylic acid may contain a substituent group which does not substantially interfere with the formation of the (cyclo)aliphatic polyester so that MQ is represented by the structure wherein, m is an integer in the range from 0 to about 12, n is an integer in the range from 2 to about 12, p is an integer in the range from 1 to 50 which may vary from one segment to another. The structure is written with the brackets positioned to emphasize that a multiplicity of polyester diol segments are inserted in the MR chains.

The CPE with the required characteristics may be conveniently formed by a conventional polycondensation procedure, or by transesterification. For example, a PBT or PPT having a number average mol wt Mn in the range from about 5000 to about 30000 (from which the MR segments are derived) is reacted with a (cyclo)aliphatic ester glycol having a Mn in the range from about 190 to about 10000 (from which the MQ segments are derived), such as is available under the *Estol® brand, so that the latter is present as MQ chains in the range from about 10 to 30%, more preferably from 10–20%, by wt of the CPE. The MR and MQ segments in end-to-end configuration form an intralinear copolymer in which their distribution is random, that is, statistically determined by the conditions of reaction. The segment length of the (cyclo)aliphatic ester glycol may not be maintained, and generally will not be, as it is well known that all ester functions may undergo transesterification reactions.

*ESTOL is a Registered Trademark of The B. F. Goodrich Company

Preparation of CPE by Transesterification:

In a 1 liter resin kettle equipped with a stirrer and a nitrogen inlet, 200 g of PBT, 30 g of oligomeric tetramethylene adipate glycol (Mn about 1000) were heated at 275° C. in the presence of 0.01 ml of titanium(iv) n-butoxide, the purpose being to break up the oligomeric tere(iso)phthalic acid polyester glycol into multiplicity of repeating units. The time needed for the reaction will depend upon the amount of catalyst, the amount of oligomeric polyester glycol, the temperature of reaction, and the desirable melting point. In this illustration, less than 2 hr is sufficient.

Preparation of CPE by Polycondensation:

In the following example, an equivalent CPE (to the foregoing) is prepared, only as an illustration, recognizing that the procedure is better utilized to prepare CPEs having desirable repeating units which are not derived from readily available polyester diols.

In a 5 gal reactor provided with a stirrer, an inlet tube for nitrogen, and a distillation condenser leading to a receiver, 6020 g of dimethyl terephthalate, 6125 g of 1,4-butanediol and 1182.7 g of tetramethylene glycol adipate (number avg mol wt about 1000) were heated in the presence of 3.72 g of titanium(iv) n-butoxide catalyst. The reaction was initiated at 165° C. and the temperature gradually raised to 215° C. Soon as the transesterification reaction is complete, as evidenced by a calculated amount of methanol being collected in the receiver, the temperature is raised to 220° C. and a slight vacuum is applied to help remove excess butanediol from the system. The second stage of the reaction, or the polycondensation, is carried out at 230°–250° C. under reduced pressure in the range from about 15 mm to about 0.3 mm to distill off butanediol until the desirable mol wt of the polymer is obtained.

Dicarboxylic acids used for the preparation of the copolyester include acid equivalents having two functional carboxyl groups which perform substantially like dicarboxylic acids in reactions with diols to form copolyesters. Such equivalents include esters, ester-forming derivatives, such as halides and anhydrides, and the like. Representative (cyclo)aliphatic acids are sebacic acid, succinic acid, glutaric acid, adipic acid, oxalic acid, azelaic acid, diethylmalonic acid, 1,4-cyclohexane dicarboxylic acid, 1,3-cyclohexane dicarboxylic acid, 3,4-furan dicarboxylic acid and 1,1-cyclobutane dicarboxylic acid. Most preferred is adipic acid.

Among the alkylene glycols used for the short chain soft segments are ethylene glycol, diethylene glycol, triethylene glycol, 1,3-propylene glycol, dipropylene glycol, 1,3-butylene glycol, 1,4-butylene glycol, neopentyl glycol, 1,5-hexalene glycol; and among the cycloalkylene glycols are 1,2-cyclopentanediol, 1,3-cyclopentanediol, 1,2-cyclohexanediol, 1,4-cyclohexanediol, cyclobutanediols, cyclobutanedimethanol, cyclohexanedimethanol and the like.

The polyblend of this invention may include conventional additives such as antioxidants, heat and light stabilizers, pigments, dyes, and the like but do not require the addition of a plasticizer. In addition, the polyblend may be reinforced with any conventional reinforcing filler, most preferably glass fiber, in an amount from about 1 to about 40% by wt, and be thermoformed by conventional forming processes such as extrusion, compression molding and the like.

The type of glass fiber used is not narrowly critical but sized rather than unsized or bare glass fibers are preferred. Most preferred are glass fibers sized with an amino silane coupling agent and a film former consisting essentially of a polymer having a ring-opened lower alkylene oxide containing from about 2 to about 4 carbon atoms as an essential component in a repeating unit optionally containing another copolymerizable component. Further details of such sized glass fiber are given in U.S. Pat. No. 4,536,360 the disclosure of which is incorporated by reference thereto as if fully set forth herein.

The various additives of the polyblend are incorporated by heating the polyblend and additives sufficiently to melt the copolyester and mixing until a uniform polyblend is obtained. The order of addition of the additives is not important though it will be evident that it is undesirable to keep the PVC at a temperature near its degradation temperature for any significant amount of time if it can be avoided, and the lowest temperature at which efficient and thorough mixing can be had, is preferred.

Suitable mixing devices include Banbury mixers, extruders and the like.

The critical crystallinity of the CPE is determined by the PPT or PBT MR segments, and (cyclo)aliphatic MQ segments, and the presence of the former in about 70–90% by wt of the CPE, the remaining 10–30% by wt being MQ segments. Though the manner in which the CPE is formed is not critical, and conventional methods are used, it is essential that a MQ segment be present in a molar ratio in the range from 0.03–0.1 for each mol of MR segment, depending on the specific structure of the MQ segment chosen. This distribution is obtained when the PBT or PPT is heated with the (cyclo)aliphatic ester in the range from about 250°–300° C.

Typical Milling Procedure:

In an illustrative milling procedure, the CPE was dumped on a two-roll mill with the roll temperature set at 420° F. and the CPE was allowed to melt completely before adding the PVC and processing aids, optionally including such additives as pigments, dyes, etc. As many passes are made as necessary to obtain a visually homogeneous mixture which is banded on the mill, and, if glass fiber is to be added, it is added in increments making sure it is assimilated and evenly distributed in the polyblend. On a laboratory mill, the milling procedure with addition of glass fiber takes about 5 min.

Figure 1:
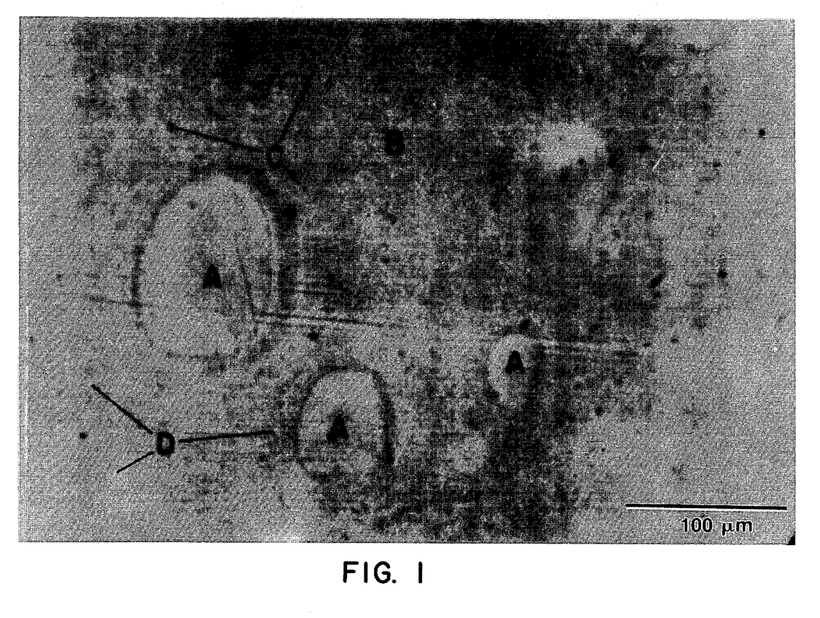
FIG. 1 is a photomicrograph, at 325 × magnification, of a polyblend of this invention milled at 420° F., showing macroparticles of PVC as the dispersed phase in the polyblend, the macroparticles being surrounded by a matrix consisting of primary PVC particles surrounded by CPE, and therefore referred to as a "first co-continuous phase".

Referring now to the photographic evidence presented as FIGS. 1–5 in which the same identifying letters refer to the same matter, and particularly to FIG. 1, there is presented a photomicrograph of a polyblend of this invention at 325× magnification, which provides evidence of two phases, namely a PVC-rich dispersed phase represented by the macroparticles, identified on the photomicrograph as "A", and a CPE-rich matrix represented by the surrounding resin, identified as "B". The speckled appearance of the CPE-rich matrix provides evidence for the presence of two co-continuous phases. The appearance of the co-continuous phases, referred to herein as the "first co-continuous phase", is unlike the characteristic uniform light gray appearance of a polyblend in which the PVC and CPE are miscible, as seen in the macroparticle "A" in the transmission electron micrograph shown in FIG. 2. The macroparticles of PVC in FIG. 1 are surrounded by the matrix consisting of contiguous microparticles "C" of PVC or PVC-rich matter (much smaller than the macroparticles "A") surrounded by CPE identified as "D"; therefore, the matrix is referred to as the "first co-continuous phase". The nearly black dots are caused by impurities or dust on the negative. The dark gray specks "C" against a background of lighter gray area "D", are the PVC-rich microparticles and the CPE-rich matter, respectively.

Figure 2:
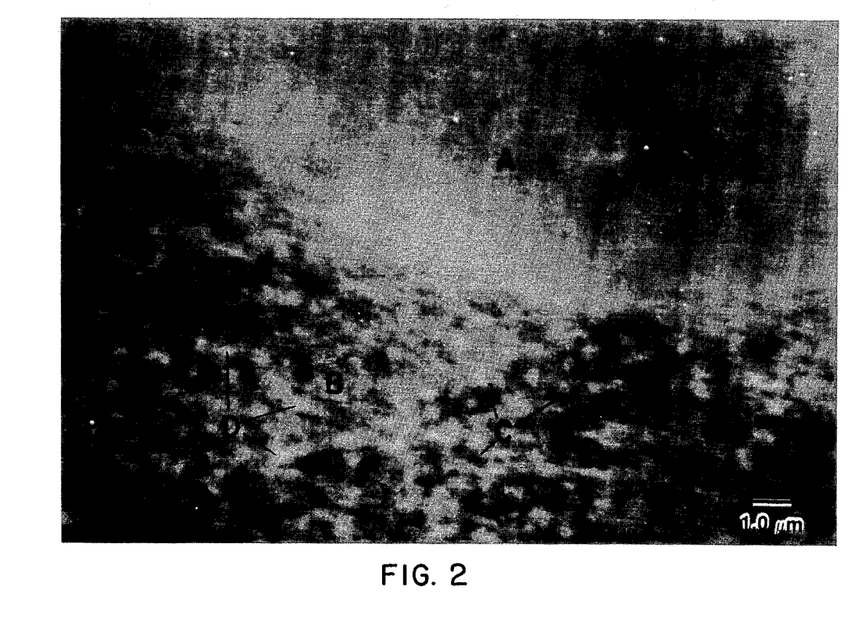
FIG. 2 is a transmission electron micrograph, taken at 8000× magnification, of the same polyblend shown in FIG. 1, showing a portion of a macroparticle in which the PVC and CPE are miscible, resulting in a single phase. The single phase macroparticle is surrounded by the matrix consisting of co-continuous PVC and CPE phases which matrix predominates in the morphology of the polyblend.

Referring further to FIG. 2 there is shown a transmission electron micrograph, taken at 8000× magnification, of the same polyblend shown in FIG. 1, showing a portion of a macroparticle "A" such as the ones identified in FIG. 1, in which portion of the macroparticle, the PVC and CPE are miscible, resulting in a single phase seen as a uniform light gray area. The single phase macroparticle is surrounded by the matrix "B" which is now seen to consist essentially of microparticles of dark PVC and PVC-rich spots "C" interspersed with light regions of CPE and CPE-rich matter, indicated as "D"; this matrix is characterized as the first co-continuous phase. In this first co-continuous phase, the PVC domains are clearly visible as small dark circles which exhibit a diffuse boundary. This provides evidence of substantial molecular mixing near the interface.

Figure 3:
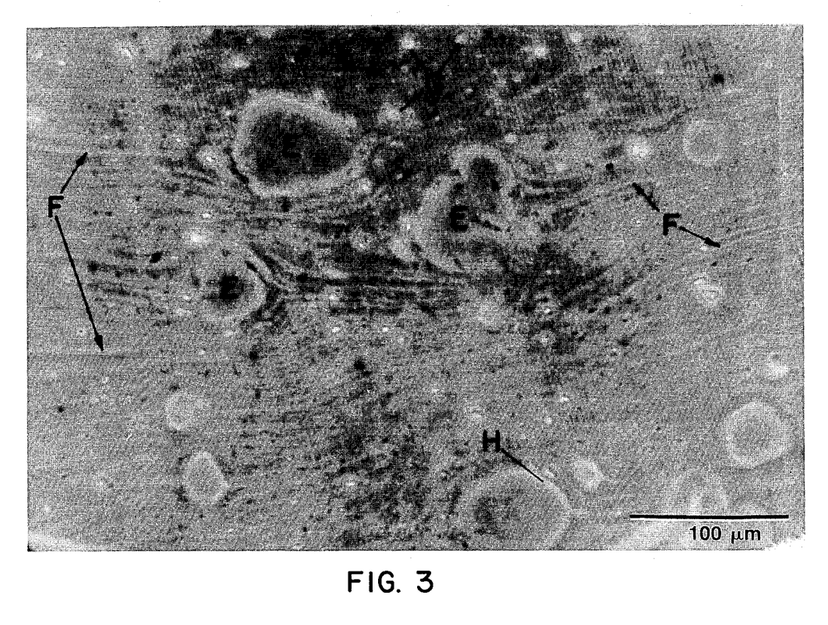
FIG. 3 is a photomicrograph, at 325 × magnification, of a polyblend of this invention milled at 375° F., showing macroparticles of PVC as the dispersed phase in the polyblend, the macroparticles being surrounded by a matrix consisting of smaller PVC particles surrounded by CPE, and therefore referred to as a "first co-continuous phase".

Referring to FIG. 3 there is presented a photomicrograph of a polyblend of this invention (325× magnification) milled at 375° F., showing macroparticles of PVC, indicated by the letter "E", as the dispersed phase in the polyblend, the macroparticles being surrounded by the first co-continuous phase (matrix "B") consisting of microparticles of PVC domains "C" surrounded by CPE "D". The appearance of this FIG. 3 is similar to that of FIG. 1 at this magnification, except that in FIG. 1 the macroparticles "A" and matrix "B" appear more uniform, due to the higher milling temperature, compared to the similar phases in FIG. 3. The wood grain-like striations are flow lines, the light flow lines "F" being CPE or CPE-rich matter. The light specks "G" appear to be substantially pure CPE. The light boundary "H" of the macroparticle "E" indicates molecular mixing.

Figure 4:
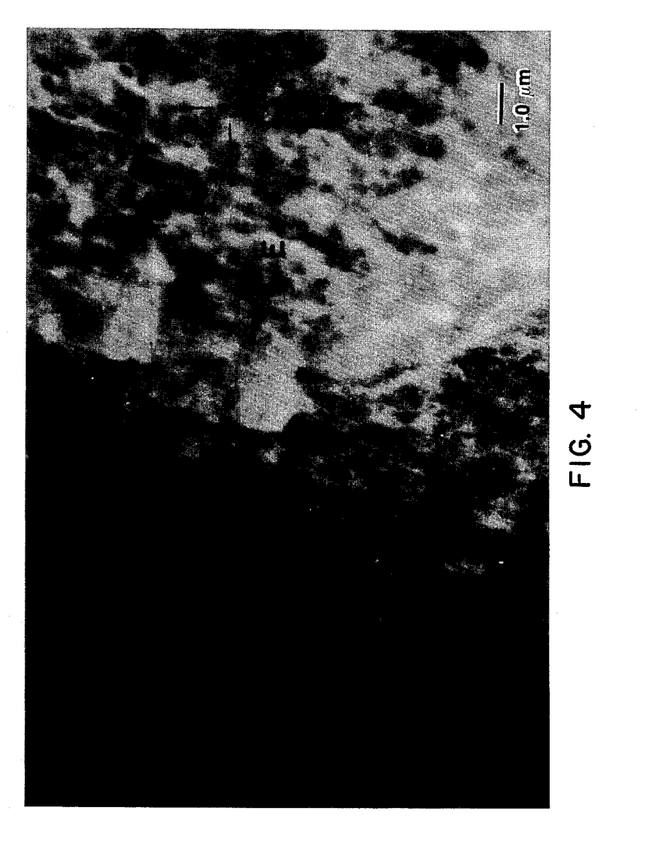
FIG. 4 is a transmission electron micrograph, taken at 8000× magnification of the same polyblend shown in FIG. 3, showing (a) a portion of a macroparticle in which the dispersed phase is the macroparticle which is suffused with CPE forming a "second co-continuous phase"; (b) the first co-continuous phase referred to hereinabove; and, (c) the boundary (indicated by the light area) outlined by molecular mixing in the zone between the first co-continuous phase, and the dispersed phase which consists of the second co-continuous phase. All PVC domains, whether in the dispersed phase or the first co-continuous phase, exhibit a diffuse interface with the CPE phase.

Referring now to FIG. 4 there is presented a transmission electron micrograph, taken at 8000× magnification of the same polyblend shown in FIG. 3, showing (a) a portion of a macroparticle "E" (the dispersed phase) composed of microparticles "J" awash with CPE, forming a "second co-continuous phase"; (b) the first co-continuous phase (matrix "B") referred to hereinabove; and, (c) the boundary "L" (delineated by the light area) indicative of molecular mixing in the zone between the first co-continuous phase, and the dispersed phase which consists of the second co-continuous phase. The domains of PVC "M" surrounded by CPE "N" in the matrix "K" are clearly visible, as is the major amount of PVC relative to the amount of the CPE in each macroparticle "E". All PVC domains, whether in the dispersed phase or the first co-continuous phase (matrix), exhibit a diffuse interface with the CPE phase.

Figure 5:
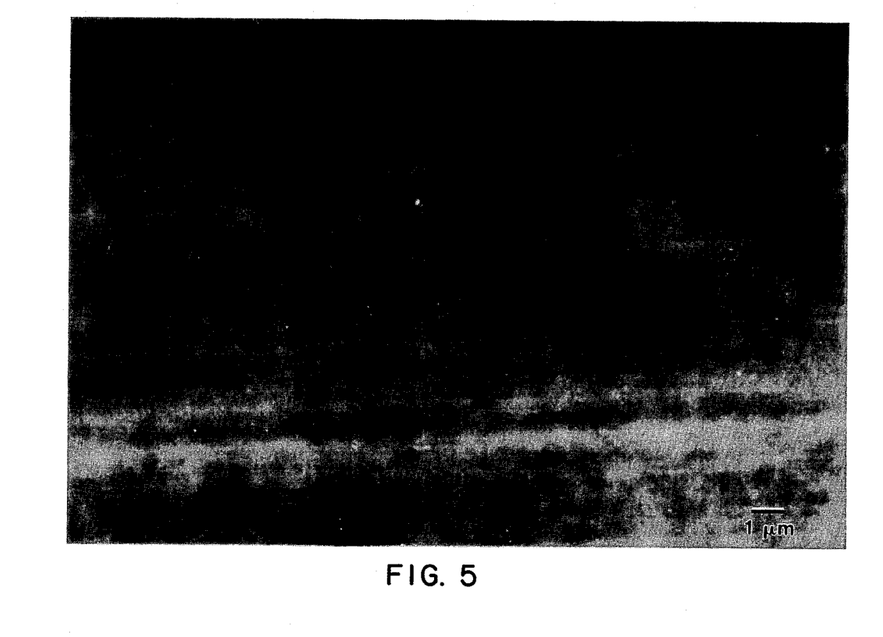
FIG. 5 is a transmission electron micrograph, taken at 15000 × magnification of extruded PVC alone.

Referring to FIG. 5 there is presented an electron photomicrograph at 15000× magnification of pure PVC. It has a characteristic, uniform mottled gray appearance. The streaks are cut lines from the microtome which is responsible for slightly varying thicknesses across the ultrathin sample. There are no discernible microparticles. The black specks "O" are impurities such as dust.

Figure 6:
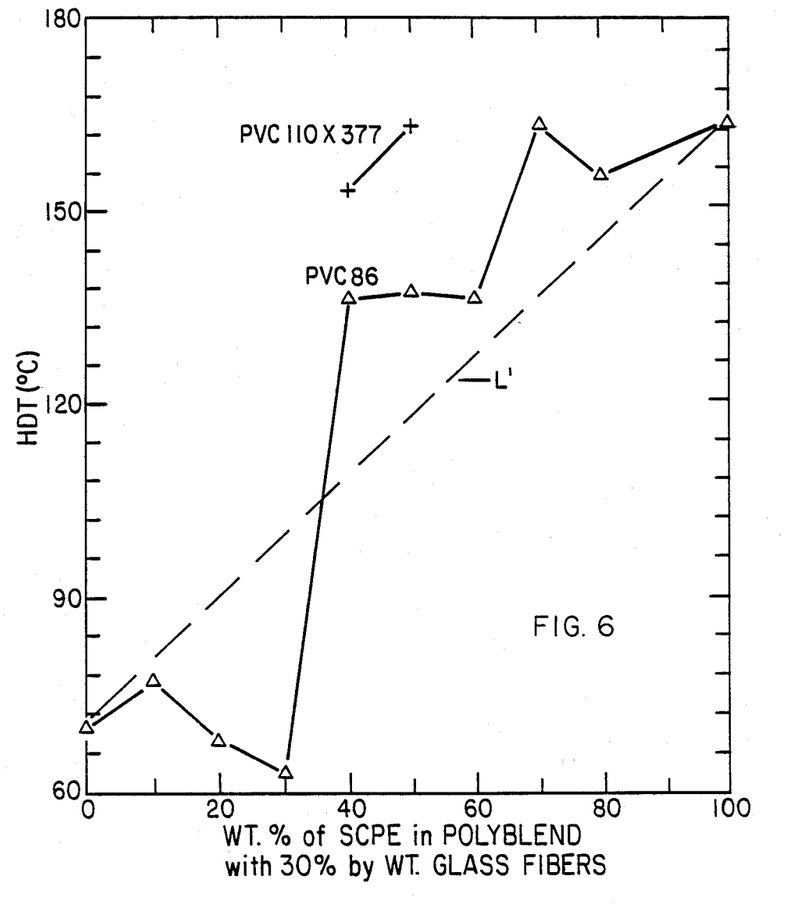
FIG. 6 graphically illustrates the effect on HDT of a glass fiber-reinforced polyblend of varying amounts of PVC and a CPE which are melt-blended to form the polyblend which has an unexpectedly higher HDT than that which might be expected from a linear proportional contribution of the HDT of CPE and the HDT of unblended PVC in the polyblend.

Refering to FIG. 6 there is plotted the values of HDT obtained with varying amounts of CPE in the polyblend prepared with PVC 110×377 and PVC 86 having different different mol wts, using the "typical milling procedure". The CPE is made as described in the illustrative procedure, and each polyblend contains 30% by wt glass. The HDT of either reinforced unblended PVC is 68° C.; the HDT of reinforced unblended CPE is 163° C. An HDT expected by linearly ratioing the contribution of HDT to the polyblend according to the amounts of PVC and CPE, will fall on the line L connecting the points representing the HDTs of the pure polymers. As seen in the curve marked "PVC 86" the HDT of the reinforced polyblend decreases until the amount of CPE reaches 30% by wt, then rises steeply. At 40% both types of PVC show a much higher HDT than that shown by line L.

It is known that glass fibers will provide much improvement of HDT in many highly crystalline polymers (see, "Towards an Understanding of Heat Distortion Temperature of Thermoplastics" by M. T. Takemori, *Polym. Eng. Sci.* Vol 19, No. 15 p 1104) but there is no indication and no reason to believe that such improvement may be provided by the glass fibers in a polyblend of an essentially amorphous polymer and a crystalline polymer. The evidence is that most such polyblends do not provide substantial improvement of HDT. For example, a polyblend of equal parts by wt of Geon PVC 110×377 or Geon PVC 86 with an CPE of terephthalic acid, 1,4-butane diol, hexanediol or polycaprolactone diol (10% of the equiv wt diol) gives an HDT lower than 70° C. with 30% by wt glass fiber. This HDT is the same as that of unblended PVC with 30% by wt glass fiber.

EXAMPLES

In the following examples, polyblends were prepared by milling the stated parts by wt of PVC 110×377 with the stated parts by wt of CPE prepared as described in the illustrative example hereinabove, along with 30% by wt of chopped glass fiber sized with an aminosilane coupling agent, on a two-roll mill at 420° F. The blended material was pelletized and injection molded. The mold temperature was about 100° C. and the cycle time was 50 sec. The nozzle temperature was about 200° C., and the extrudate was annealed at 120° C. for 30 min.

The following Table I sets forth results obtained. Values for the injection molded samples are given under the column "inj", and those for the compression molded samples are given under the column "comp". The injection molded samples were annealed as stated. The compression molded samples were prepared as described in the illustrative example hereinabove.

TABLE I

|  | PVC/CPE/glass 60/40/30 | | PVC/CPE/glass 50/50/30 | |
|---|---|---|---|---|
|  | inj | comp | inj | comp |
| Tensile strength ($10^3$ psi) | 7.6 | 11.5 | 10.4 | 11.9 |
| Flexural modulus ($10^5$ psi) | 9.2 | 9. | 11.5 | 11 |
| Izod impact (ft-lb/in) | 1.0 | 3.2 | 1.3 | 2.9 |
| HDT (°C.) | 92 | 151.5 | 124 | 162 |
| Crystallinity | 26 | 32 | 31 | 36 |

Figure 7:
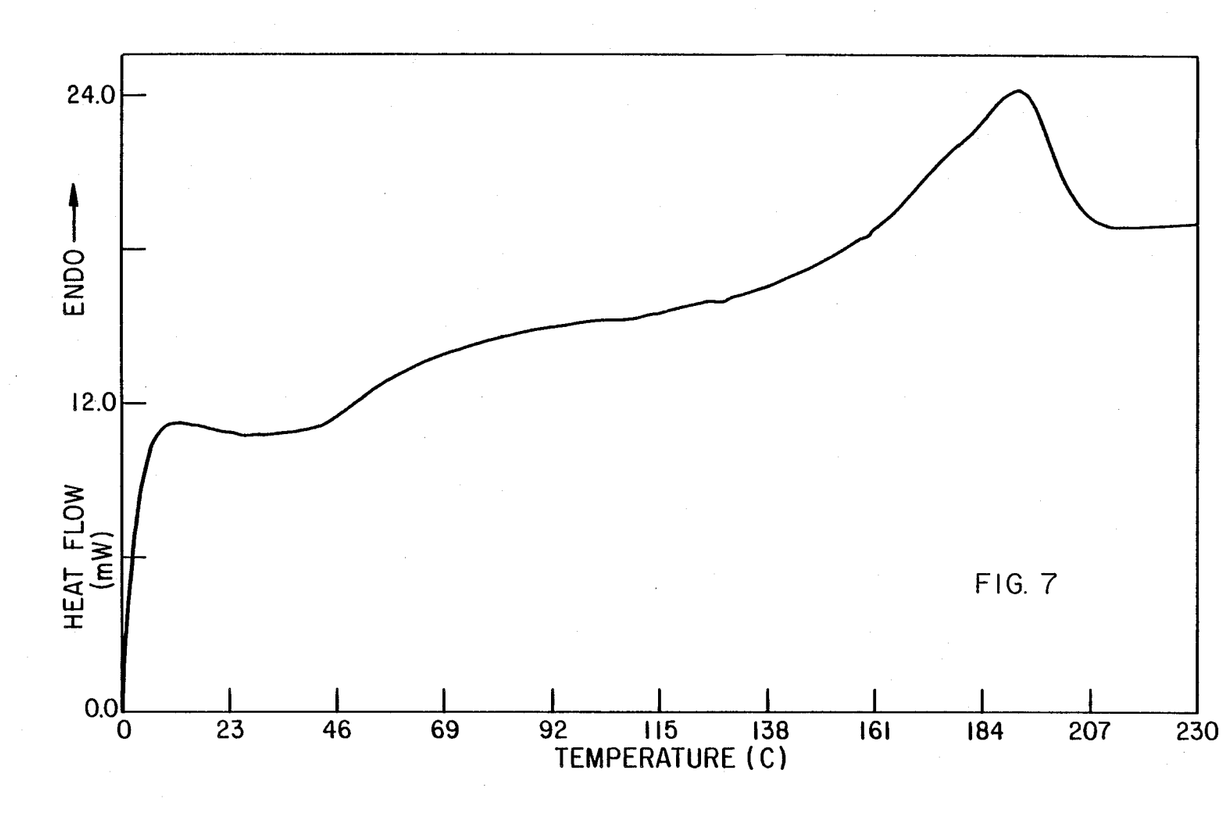
FIG. 7 is a differential scanning calorimeter (DSC) curve for a 50/50 polyblend of PVC and CPE milled at 420° F.

Whether the polyblend is reinforced makes little difference to its $T_g$ which is sensitive to the ratio of PVC to CPE, and to the chemical structure and length of the respective CPE segments. Corroboration of the limited misicibility evidenced in the photographs (FIGS. 1+14) is provided by FIG. 7 which shows a DSC curve (2nd heat) for a 50/50 PVC/CPE polyblend which exhibits a "broadened $T_g$" so referred to because it is characteristically unlike the sharper curves obtained for the PVC and CPE components individually. For the particular PVC and CPE used in the polyblend these are 79.7° C. and 49.6° C. respectively, and these DSC curves have a steep initial section, comparable to that shown in FIG. 7, but an immediate plateauing in contrast to the gradual levelling off seen in FIG. 7. It is the limited miscibility which gives rise to this gradual levelling off. If the components were immiscible, two $T_g$s would be seen, one for each component at its respective temperature (not shifted).

The peculiar structure and crystallinity of the CPE present in the range from 30% to 70% by weight in my polyblend, provides it with a negligible plasticization effect as evidenced by its relatively flat flexural modulus curve. Referring to FIG. 8, there is shown a curve, identified by curve A, of the flexural modulus (psi) of my polyblend plotted against the % by weight of PVC present in the polyblend. Curve B is a similar plot for a polyblend made with Hytrel 7246 which is an SCPE disclosed in the Crawford '982 patent.

Each curve A and B is approximated with straight lines A' and B' respectively, both of which intersect, for 100% PVC, at a point which coincides with the flex modulus of PVC, namely $4.4 \times 10^5$ psi. It is evident that the line B' has a steeper slope than line A', indicating a large plasticizing effect which is the function Crawford wanted his SCPE to provide (see col 7, lines 60-65 of the '982 patent). It is because he wished to provide the plasticizing function that he used long chain glycols to provide the "soft" segments. By substituting relatively low mol wt polyester diol segments for the long chain glycols in his soft segments, I change the characteristics of the SCPE to those of CPE with particular crystallinity, so that when blended with PVC, the CPE does not provide a typical plasticizing function, but does provide the limited miscibility which results in the relatively flat felxural modulus curve. A modulus curve which has a slope greater than $1.2 \times 10^5$ psi per unit weight of PVC in the polyblend, indicates an unacceptable plasticizing effect and a lack of desirable limited miscibility, the lower (or flatter) the slope the better.

This limited miscibility results from the fundamental difference in the CPE which is non-elastomeric, has only polyester linkages, and is free of polyether linkages. Further, it is only when the weight ratio of the MQ segments in the total number of segments in the SCPE is in the range from about 10% to about 20% by wt, that the relatively flat flexural modulusis obtained. This is precisely the ratio Crawford avoided because he sought to plasticize the PVC. Several different available Hytrel SCPEs 4056, 5526, 6346, and 7246 are available, but only the Hytrel 7246 has a 19% by wt ratio of soft segments, to 81% by wt hard segments each of which has an average block length of 22 units. The Hytrel 7246 SCPE, expected to have the least possible plasticization effect because it contains the greatest percentage of hard segments, is the prior art SCPE I have used for making the comparison to emphasize the difference in the effects of the SCPE and the CPE in a polyblend.

It is because of the structural differences between my CPE and the SCPE of Crawford, that the properties of the polyblend are so unexpectedly different. These differences are evident in the NMR and mass spectra which show that the SCPEs have polyether linkages and the CPE has only polyester linkages. Also, the differences are due to the starting polyester diol being broken up, by ester interchange, into a multiplicity of ester segments each of which has an aryl dicarboxylic acid residue (phthalic acid or isophthalic acid) which is connected to an ester segment, and the majority of these segments in the CPE have a residue with a Mn less than 600. This would not be the case in an SCPE even if a polyester diol was used instead of a polyether diol, because Crawford specifically cautioned against breaking up the polyester diol—which is what is required in my CPE.

I claim:

1. A polyblend consisting essentially of from about 30:70 to about 70:30 parts by weight of poly(vinyl chloride) homopolymer ("PVC") and a copolyester ("CPE") having limited miscibility in the PVC, as evidenced by a first co-continuous CPE-rich phase in which domains of PVC microparticles and CPE are present as distinct discernible phases and the PVC domains have diffuse boundaries, and, a dispersed PVC-rich phase consisting essentially of macroparticles of PVC suffused with a non-elastomeric CPE, said CPE having (i) the formula $$-(MR)_x-(MQ)_y- \qquad (I)$$

wherein, $(MR)_x$ represents an ester segment having a repeating unit with a mol wt of about 204 or 220;

$(MQ)_y$ represents an ester segment consisting essentially of the residue of a polyester diol;

M represents the residue of terephthalic acid which may include a minor amount of isophthalic acid;

R represents the residue of 1,3-propane diol or 1,4-butane diol;

Q represents the residue of a (cyclo)aliphatic polyester of an aliphatic or cycloaliphatic dibasic acid having from 2 to about 12 carbon atoms, and, an alkane or cycloalkane diol having from 2 to about 12 carbon atoms; and, x and y represent the mole fractions present, y being in the range from 0.03–0.10 when x is 1.0, so that a majority of all MQ segments have a residue of a polyester diol having a number average molecular weight less than 600;

said MQ (cyclo)aliphatic polyester segment having the structure wherein m is an integer in the range from 0 to about 12, n is an integer in the range from 2 to about 12, and, p is an integer in the range from 1 to 50;

(ii) crystallinity in the range from 30–90%, and an elongation at break less than 100%, and, (iii) a melting temperature (Tm) in the range of the processing temperature of the PVC, so that said polyblend has a crystallinity in the range from 25% to about 55%, and a flexural modulus of $3.8 \pm 0.5 \times 10^5$ psi.

2. The polyblend of claim 1 wherein said PVC domains in the dispersed phase and also in the first cocontinuous phase, are in the size range from about 200 Angstroms to about 5000 Angstroms, and the dispersed phase PVC macroparticles are in the size range from about 50 microns to about 200 microns.

3. The polyblend of claim 1 wherein said PVC-rich dispersed phase consists-essentially of CPE in which PVC is miscible.

4. The polyblend of claim 1 wherein said PVC-rich dispersed phase consists essentially of microparticles suffused with CPE forming a second co-continuous phase.

5. The polyblend of claim 1 including from 5% to about 40% by wt of glass fiber substantially homogeneously distributed therewithin.

6. The polyblend of claim 1 wherein said PVC-rich dispersed phase consists essentially of microparticles suffused with CPE forming a second co-continuous phase.

7. The polyblend of claim 2 wherein said CPE has a melting point in the range from 170° C. to about 220° C.

8. The polyblend of claim 4 wherein said CPE has from 70–90% by wt of MR segments, and from 10–30% by wt of MQ segments.

9. The polyblend of claim 6 wherein said PVC has an inherent viscosity, measured in cyclohexanone at 30° C., in the range from about 0.4 to about 1.5.

10. The polyblend of claim 9 including from about 5% to about 40% by weight of a glass fiber reinforcing filler, said polyblend having a heat distortion temperature greater than the proportional contribution of the heat distortion temperature of said PVC reinforced with said glass fiber and said CPE reinforced with said glass fiber, from which PVC and CPE said polyblend is formed.

11. A shaped article of a glass fiber reinforced, melt-blended, polyblend comprising, glass fiber and, poly(vinyl chloride) homopolymer ("PVC") having an inherent viscosity in the range from about 0.4 to about 1.5, measured in cyclohexanone at 30° C., and, a copolyester ("CPE") having (i) the formula $$-(MR)_x-(MQ)_y-$$

wherein, $(MR)_x$ represents an ester segment having a repeating unit with a mol wt of about 204 or 220;

$(MQ)_y$ represents an ester segment consisting essentially of the residue of a polyester diol;

M represents the residue of terephthalic acid which may include a minor segment of isophthalic acid;

R represents the residue of 1,3-propane diol or 1,14-butane diol;

Q represents the residue of a (cyclo)aliphatic polyester of an aliphatic or cycloaliphatic dibasic acid having from 2 to about 12 carbon atoms, and, an alkane or cycloalkane diol having from 2 to about 12 carbon atoms; and, x and y represent the mole fractions present, y being in the range from 0.03–0.10 when x is 1.0; so that a majority of all MQ segments have a residue of a polyester diol having a number average molecular weight less than 600;

said MQ short chain (cyclo)aliphatic polyester segment having the structure wherein, m is an integer in the range from 0 to about 12, n is an integer in the range from 2 to about 12, and, p is an integer in the range from 1 to 50;

(ii) crystallinity in the range from 30–90%, and an elongation at break less than 100%, and (iii) a melting temperature (Tm) in the range of the processing temperature of the PVC, so that said polyblend has a crystallinity in the range from 25% to about 55%, and, a flexural modulus of $3.8 \pm 0.5 \times 10^5$ psi, whereby said glass fiber reinforced polyblend has a heat distortion temperature (HDT) as determined by ASTM-D-648 greater than the sum of the proportional contribution of the HDT of said PVC reinforced with said glass fiber, and the HDT of said CPE reinforced with said glass fiber.

12. The shaped article of claim 11 in the form of a pellet.

13. The shaped article of claim 11 in the form of an extruded longitudinal body of arbitrary length and shape.

14. The shaped article of claim 11 in the form of a compression molded laminar body of arbitrary shape.

* * * * *